United States Patent
Parker et al.

(10) Patent No.: US 6,169,817 B1
(45) Date of Patent: Jan. 2, 2001

(54) SYSTEM AND METHOD FOR 4D RECONSTRUCTION AND VISUALIZATION

(75) Inventors: Kevin J. Parker; Saara Marjatta Sofia Totterman; Jose Tamez Peña, all of Rochester, NY (US)

(73) Assignee: University of Rochester, Rochester, NY (US)

( * ) Notice: Under 35 U.S.C. 154(b), the term of this patent shall be extended for 0 days.

(21) Appl. No.: 09/185,514

(22) Filed: Nov. 4, 1998

(51) Int. Cl.$^7$ ........................ G06K 9/36

(52) U.S. Cl. .................. 382/131; 128/173; 345/419; 345/424

(58) Field of Search ................ 382/276, 128, 382/129, 130, 131, 132, 133, 134, 154, 173, 195; 600/300; 378/4, 18, 23, 62, 63; 345/121, 419, 424

(56) References Cited

U.S. PATENT DOCUMENTS

| | | | | |
|---|---|---|---|---|
| 5,412,563 | * | 5/1995 | Cline et al. | 364/413.22 |
| 5,442,733 | * | 8/1995 | Kaufman et al. | 395/124 |
| 5,633,951 | * | 5/1997 | Moshfeghi | 382/154 |
| 5,818,231 | * | 10/1998 | Smith | 324/309 |
| 5,825,909 | | 10/1998 | Jang | 382/132 |
| 5,839,440 | * | 11/1998 | Liou et al. | 128/654 |
| 5,891,030 | * | 4/1999 | Johnson et al. | 600/407 |
| 5,926,568 | | 7/1999 | Chaney et al. | 382/217 |

OTHER PUBLICATIONS

Saara Totterman, et al., "3D Visual Presentation of Shoulder Joint Motion" 1998, pp. 27–33.

José G. Tamez Peña, et al., Automatic Statistical Segmentation of Medical Volumetric Images, IEEE Computer Vision and Pattern Recognition 98, pp 1–7.

Jagath C. Rajapakse, et al., Statistical Approach to Segmentation of Single–Channel Cerebral MR Images, IEEE Transactions on medical imaging, vol. 16, No. 2, pp. 176–186, 1997.

W.M. Wells III et al., "Adaptive Segmentation of MRI Data", IEEE Transactions on Medical Imaging, pp. 429–440, 1996.

M.W. Hansen, et al., "Relaxation Methods for Supervised Image Segmentation", IEEE Trans. Patt. Anal. Mach. Intel., vol. 19, pp. 949–962, 1997.

E.A. Ashton, et al., Segmentation and Feature Extraction Techniques, with Applications to MRI Head Studies, IEEE Transactions on Medical Imaging, vol. 16, pp. 365–371, 1997.

W.E. Higgins, et al., "Extraction of Left–Ventricular Chamber from 3–D CT Images of the Heart", Transactions on Medical Imaging, vol. 9, No. 4, pp. 384–394, 1990.

\* cited by examiner

*Primary Examiner*—Bhavesh Mehta
*Assistant Examiner*—Kanji Patel
(74) *Attorney, Agent, or Firm*—Blank Rome Comisky & McCauley LLP

(57) ABSTRACT

From raw image data obtained through magnetic resonance imaging or the like, an object is reconstructed and visualized in four dimensions (both space and time) by first dividing the first image in the sequence of images into regions through statistical estimation of the mean value and variance of the image data and joining of picture elements (voxels) that are sufficiently similar and then extrapolating the regions to the remainder of the images by using known motion characteristics of components of the image (e.g., spring constants of muscles and tendons) to estimate the rigid and deformational motion of each region from image to image. The object and its regions can be rendered and interacted with in a four-dimensional virtual reality environment.

37 Claims, 5 Drawing Sheets

SYSTEM AND METHOD FOR 4D RECONSTRUCTION AND VISUALIZATION

BACKGROUND OF THE INVENTION

The present invention is directed to a system of and method for reconstruction and visualization of an object from raw image data of the object in four dimensions (three dimensions of space and one of time), using already known characteristics of the object to analyze the raw image data. More particularly, the present invention is directed to a system of and method for visualizing an object from a time sequence of bitmapped images of the object. In one embodiment, the present invention is more specifically directed to such a system and method for use in imaging MRI (magnetic resonance imaging) data of human body parts. The distinct organs, tissues and bones are reconstructed in four dimensions in virtual (digital) space, creating a "digital clone" or virtual reality replica of the moving human body.

The ability to evaluate the motion patterns of human joints, including both the bones and the soft tissue structures, would greatly increase understanding of the development and staging of such conditions as osteoarthrosis. Although there is a large body of information about the biomechanics and kinematics of the anatomical structures of human joints, the information is based mostly on cadaver studies and on two-dimensional image-based studies. So far, there have been no successful systems that can display in vivo three-dimensional joint kinematics.

While it is known in the art to reconstruct and visualize high-contrast anatomical structures in three spatial dimensions, the resulting reconstruction is static and provides no time-based information. Many problems to be diagnosed and treated are related to abnormal motion kinematic events in complex structures such as joints; therefore, imaging in four dimensions (both time and space) is desirable.

The best current source of raw image data for observation of a complex soft tissue and bone structure is magnetic resonance imaging (MRI). However, MRI often introduces the following technical challenges. Many of the anatomical structures to be visualized require high resolution and present low contrast, since many of the musculoskeletal structures to be imaged are small and intricate. MRI involves the use of local field coils to generate an electromagnetic field; such local field coils form a non-uniform illumination field. MRI images can also be noisy. Any technique for reconstruction and visualization that uses MRI image data should meet those challenges.

Although there has been some research in the area of deformable motion tracking and analysis, most of that research has concentrated on the time evolution of a single structure in the image based on simple parametric deformable models. The kinematic analysis of a joint involves the motion of many structures, thus making the conventional approaches unsuitable.

Moreover, the known techniques for 3D reconstruction and visualization offer the following disadvantages. First, such known techniques are too computationally intensive to be used practically for a time sequence of images. Second, most known algorithms for 3D reconstruction and visualization are supervised (i.e., require operator intervention) and rely on the expert knowledge of a radiologist or another such person. That supervision limits the range of applications of those algorithms to some specific, anatomically simple structures such as bones, the heart, and the hippocampus. On the other hand, the successfully unsupervised techniques in the prior art are specific to one organ and are thus limited in the range of anatomical structures that they can handle.

Examples of supervised techniques are taught in the following references:

W. E. Higgins et al, "Extraction of left-ventricular chamber from 3D CT images of the heart," *Transactions on Medical Imaging*, Vol. 9, no. 4, pp. 384–394, 1990;

E. A. Ashton et al, "A novel volumetric feature extraction technique with applications to MRI images," *IEEE Transactions on Medical Imaging*, Vol. 16, pp. 365–371, 1997; and M. W. Hansen et al, "Relaxation methods for supervised image segmentation," *IEEE Trans. Patt. Anal. Mach. Intel.*, Vol. 19, pp. 949–962, 1997.

Examples of unsupervised techniques are taught in the following references:

W. M. Wells III et al, "Adaptive segmentation of MR data," *IEEE Transactions on Medical Imaging*, pp. 429–440, 1996; and J. Rajapalse et al, "Statistical approach to segmentation of single-channel cerebral MR images," *IEEE Transactions on Medical Imaging*, Vol. 16, no. 2, pp. 176–186, 1997.

The inventors have presented related concepts in Tamez-Peña et al, "Automatic Statistical Segmentation of Medical Volumetric Images," *IEEE Computer Vision and Pattern Recognition* 98. All of the references cited above are hereby incorporated by reference in their entirety into the present disclosure.

SUMMARY AND OBJECTS OF THE INVENTION

An object of the present invention is to provide a system of and method for 4D (space and time) kinematic reconstruction and visualization of body tissue or the like.

Another object of the present invention is to provide a system of and method for reconstruction and visualization that incorporates motion tracking.

Still another object of the present invention is to provide a system of and method for reconstruction and visualization that allow an unlimited number of tissue segments at the same time.

Yet another object of the present invention is to provide a system of and method for reconstruction and visualization that take into account the biomechanical properties of the tissue being reconstructed and visualized.

Still another object of the present invention is to provide a system of and method for visualization and reconstruction that incorporate a database of such biomechanical properties.

Another object of the present invention is to provide a system of and method for visualization and reconstruction that produce a finite element biomechanical model.

An additional object of the present invention is to provide a system of and method for visualization and reconstruction that produce a "digital clone" or virtual reality replica of the human body that can be acted on in virtual space and whereby the body parts respond in a realistic manner in virtual space to applied forces.

To achieve these and other objects, the present invention is directed to a system and method that implement the following technique. One image in the sequence of images, typically the first, is segmented through statistical techniques to identify the tissues and structures shown in the image. Then, instead of doing the same thing for all of the images, the segmenting is carried over to all of the images by estimating the motion of each of the tissues and structures. The estimation takes into account known properties of the tissues and structures expressing the known properties in terms of spring elastic constants.

The segmenting can be done in the following manner. First, a time sequence of 3D images is formed, as by MRI, to obtain raw image data. The first image is divided or segmented into regions, each of the regions corresponding to a tissue or structure of the body part being imaged. The statistical technique for segmenting involves estimating a local mean value and a local variance for the image in each voxel (three-dimensional pixel). The voxels are joined into regions if their estimated local mean values and estimated local variances are sufficiently similar. Thus, regions are defined corresponding to the various tissues or structures, so that tendons, bones, and the like can be identified.

Once the segmenting is done on the first image, it is carried over to the other images to save the computational power that would be used to segment all of the images in the same manner. That carrying over uses known motion characteristics of the various components and expresses them as spring constants. For example, the characteristics of the connection between a tendon and a bone can be expressed by imagining a spring that connects the two and giving its spring constant. Those known motion characteristics can be used to estimate the velocity (speed and direction) at which each tissue or structure should be moving. The estimated velocities can be used to determine where each tissue or structure should be in the next image thereby carrying over the segmentation from one image in the sequence to the next.

Because the segmentation is statistical rather than exact, it is preferable to use multiple statistical tests to determine whether any two voxels should be connected. Because an erroneous connection is more damaging to the quality of the finished visualization than an erroneous failure to connect, a particular implementation of the technique can require that the statistical tests agree before the connection is made.

Also, the statistical tests require setting certain threshold or cutoff values. Of course, a badly chosen cutoff value can throw off the whole visualization technique. To avoid such a result, one embodiment of the invention provides an iterative technique for optimizing the cutoff values.

At the conclusion of these steps, a detailed four-dimensional representation of bone, muscles, skin and other tissues is available as a "digital clone" in virtual reality. The "digital clone" includes motion and biomechanical properties. The virtual reality representation can be interacted with by a clinician by, for example, examining specific tissues or by applying forces.

BRIEF DESCRIPTION OF THE DRAWINGS

A preferred embodiment of the present invention will now be set forth in detail with reference to the drawings, in which.

DETAILED DESCRIPTION OF THE PREFERRED EMBODIMENT

The processes described herein have been carried out on a Silicon Graphics Indigo workstation. For visualization, an Irix Explorer 3D graphics engine was used. However, those skilled in the art who have reviewed this disclosure will readily appreciate that the present invention can be adapted to any sufficiently robust hardware and software.

A sequence of images formed by an MRI or any other method is received as raw image data, with each image typically in the form of a gray-scale bitmap. For the image data to be of any use, each image must be segmented; that is, features in the image such as a bone and the muscle surrounding the bone must be isolated. While each image in the sequence can be segmented separately, the inventors have found that it is more computationally efficient to segment the first 3D image in the sequence and to track the motion of the various features to extrapolate from the segmentation of the first image to segment the remaining images.

More specifically, an object to be imaged exists in a continuous space of points $x_c=(x_c, y_c, z_c)$, whereas its image is modeled in a discrete space of points $x=(x, y, z)$, where each discrete point x is called a voxel. A temporal volumetric digital image $g(x, y, z)$, which is typically a gray-scale image, is modeled as a sampled version of a continuous 3D temporal image $g_c(x_c, y_c, z_c, t)$. The continuous image can be assumed to be formed by illuminating a 3D complex dynamic object $f(x_c, t)$ with a time-invariant illumination field $I(x)$.

It is assumed that every region $R_i$ can be modeled as a random field $Z=\{Z(x,y,z), (x,y,z) \in R_i\}$. Thus, every region is a stochastic process over that region, where the random field $Z(x,y,z)$ is a random variable associated with the voxel $x=(x,y,z)$ at any point in $R_i$.

The object f is taken to be composed of M distinct regions $R_1, R_2, \ldots R_M$. When those regions are described as distinct, what is meant is that for any $i \neq j$, $R_i \cap R_j = \emptyset$. If the continuous image $g_c$ is corrupted by independent additive Gaussian noise $\eta$, the observed discrete image g at a voxel $x \in g$ at time $t=kT$ is given by $$g(x,t)=I(x+\Delta x, y+\Delta y, z+\Delta z)f(x+\Delta x, y+\Delta y, z+\Delta z, kT)+\eta(x+\Delta x, y+\Delta y, z+\Delta z, kT),$$

where $(\Delta x, \Delta y, \Delta z)$ are the sampling spacing intervals.

A goal of the present invention is to analyze the motion of the M regions that make up f. To do so, the present invention implements segmenting and tracking of those regions from the observed image g, which, as noted above, is corrupted by Gaussian noise. That is, a hierarchical implementation of volume (3D) segmentation and motion estimation and tracking is implemented. The 3D segmentation will be described first.

Figure 1:
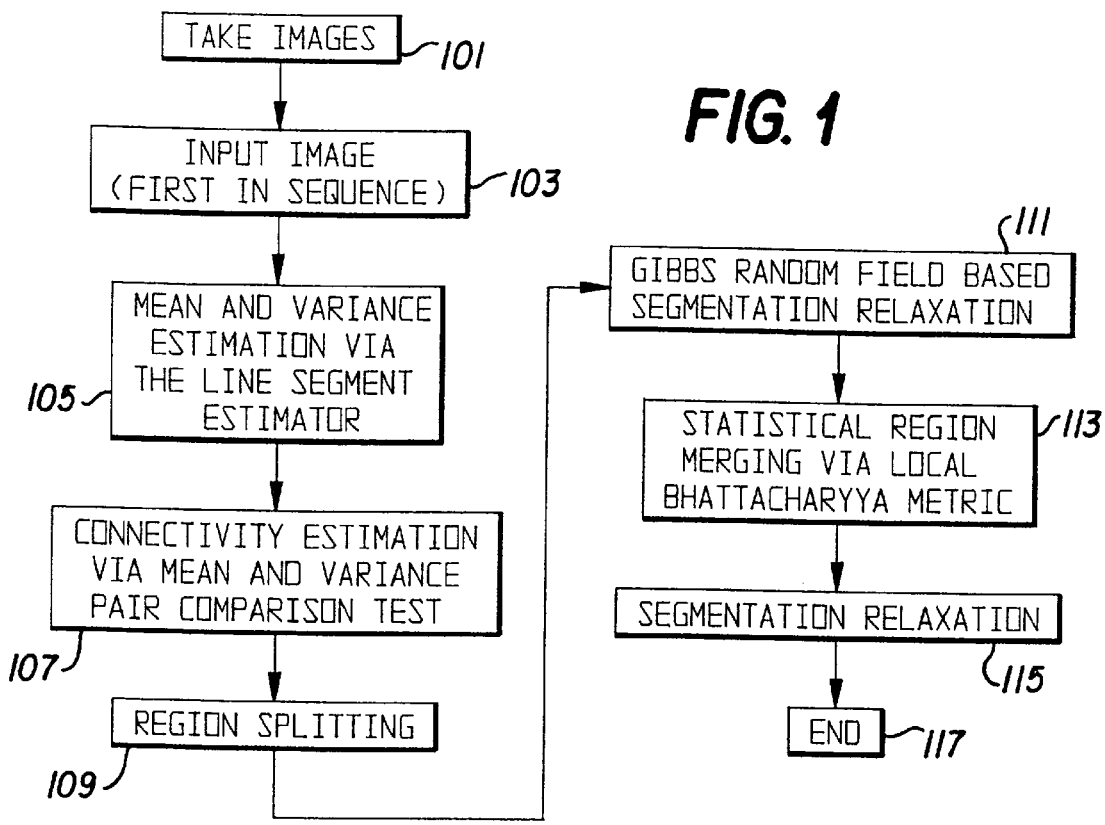
FIG. 1 is a diagram of a flow chart of the operational steps involved in segmenting an image.

Referring now to the drawings in which like elements are indicated by like reference numerals, the segmentation process is outlined in the flow chart of FIG. 1. The steps will be summarized here and described in detail below.

First, at step 101, the images in the sequence are taken, as by an MRI. Raw image data are thus obtained. Then, at step 103, the raw data of the first image in the sequence are input into a computing device such as that identified above. Next, for each voxel, the local mean value and region variance of the image data are estimated at step 105. The connectivity among the voxels is estimated at step 107 by a comparison of the mean values and variances estimated at step 105 to form regions. Once the connectivity is estimated, it is determined which regions need to be split, and those regions are split, at step 109. The accuracy of those regions can be improved still more through the segmentation relaxation of step 111. Then, it is determined which regions need to be merged, and those regions are merged, at step 113. Again, segmentation relaxation is performed, at step 115. Thus, the raw image data are converted into a segmented image, which is the end result at step 117.

The estimation of the local mean and variance as at step 105 and the estimation of the connectivity as at step 107 are based on a linkage region growing scheme in which every voxel in the volume is regarded as a node in a graph. First, the concepts of a neighborhood system and a clique in a three-dimensional space will be defined. $G_i(x,y,z)=G_{x,y,z}$, $(x,y,z) \in R_i$, is called a neighborhood system on $R_i$. That means that $G_i$ is a collection of subsets of $R_i$ for which $\{x \notin G_x$ and $x_k \in G_i(x_j)\} \leftrightarrow x_j \in G_i(x_k)\}$. Thus, $G_i(x)$ is a set of neighbors of x. A subset $C_i(x) \subseteq R_i$ is a clique if every pair of voxels in $C_i(x)$ are neighbors. Voxels at or near the boundary of $R_i$ have fewer neighbors than do voxels in the interior.

Neighboring voxels whose properties are similar enough are joined by an arc. Each image segment $R_i$ is the maximal set of all voxels belonging to the same connected components. If it is assumed that the image is composed of Gaussian textured regions $Z_i$, each voxel x in the image can be assigned the following two properties: the local mean value $\mu_i(x)$ and the local region variance $\delta_i^2(x)$. That is, $Z_i=N(\mu_i,\delta_i)$. Two voxels are connected by an arc if their mean value and variance are similar enough. If those two properties are known, the similarity of two voxels can be tested according to their Gaussian cumulative distribution function. On the other hand, if it is only possible to estimate the properties with a certain confidence, comparative statistical tests can be used.

The local mean and the variance in the presence of noise, as at step 105, are estimated in the following manner. Standard image restoration techniques do not properly address the region's boundary. The boundary problem is addressed by assuming a Gibbs random field of the estimated parameters; that is, the estimated values for a given voxel are functions of the image values at connected vowels. Given a voxel x and associated connected neighboring vowels, the least square estimates of the mean $\hat{\mu}(x)$ and the variance a $\hat{\delta}^2(x)$ can be obtained from the observed data through the following equations:

$$\hat{\mu}_0(x) = \sum_{\forall x_j \in G(x_i)} a_{i,j} g(x_j)$$

$$\hat{\delta}^2(x_i) = \sum_{\forall x_j \in G(x_i)} [a_{i,j} g^2(x_j) - \hat{\mu}(x_i)^2]$$

where $$a_{i,j} = \begin{cases} \dfrac{\hat{a}_{i,j}}{N} & x_j \in G_k(x_i) \\ 0 & x_j \notin G_k(x_i) \end{cases}$$

Figure 2:
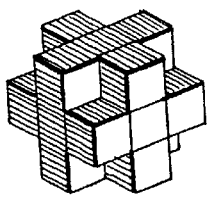
FIGS. 2–5 are drawings showing a neighborhood system of voxels used in the segmentation of FIG. 1.
Figure 3:
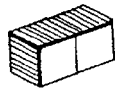
Figure 4:
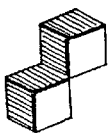
Figure 5:
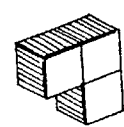
Figure 5A:
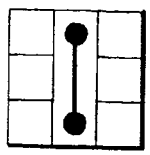
FIGS. 5A–5L are drawings showing possible line segments drawn among voxels in a two-dimensional plane in the neighborhood system of FIGS. 2–5.
Figure 5B:
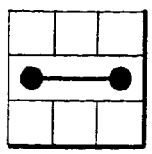
Figure 5C:
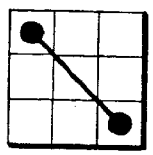
Figure 5D:
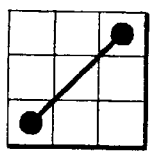
Figure 5E:
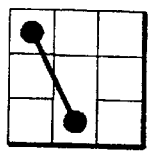
Figure 5F:
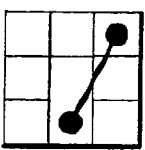
Figure 5G:
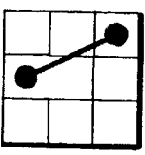
Figure 5H:
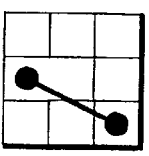
Figure 5I:
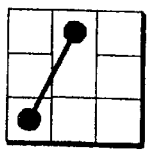
Figure 5J:
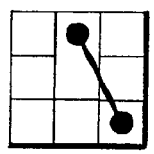
Figure 5K:
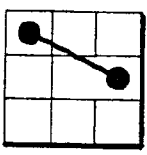
Figure 5L:
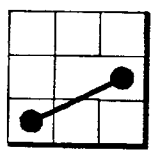

N is the number of connected vowels, and $\hat{a}_{ij}$ are weights. The connectivity is unknown at that stage. To address that problem, a series of hypotheses is assumed regarding the connectivity of simple line segments on the three-dimensional space. First, a line segment in the three-dimensional space is defined as a pair of two element cliques that share the same neighboring voxel. Therefore, for every voxel, there are multiple line segments, each formed by two neighboring voxels that are neighboring to that voxel but not to each other. If the neighboring system shown in FIG. 2 is assumed, in which neighboring voxels are those having any of the relationships shown in FIGS. 3–5, there are nineteen possible line segments, of which twelve line segments lying in an orthogonal plane are shown in FIGS. 5A–5L. The line segments are detected by computing the local dispersion of the data:

$$\sigma_p(x) = \frac{1}{M} \sum_{\forall x_k \in G(x)} (|p(x_k) - p(x)|)$$

where M is the number of neighbor points from FIGS. 2–5. A line segment detector can thus be defined as:

$$L_p(x, x_i, x_j) = \begin{cases} 1 & \begin{array}{l} \text{if } |p(x) - p(x_i)| < T_0 \sigma_p(x), x_i \in G(x), x_i \notin G(x_j) \\ \text{and } |p(x) - p(x_j)| < T_0 \sigma_p(x), x_j \in G(x), x_j \notin G(x_i) \end{array} \\ 0 & \text{otherwise} \end{cases}$$

where p(x) is a feature of the voxel. That feature can be either the mean or the variance at that voxel. $T_0$ is a threshold. The points $\{x, x_i, x_j\}$ belong to the same line segment if $L_p\{x, x_i, x_j\}=1$. Thus, the procedure just described is called a line-segment detector.

For most medical images, the estimated voxel mean value and the estimated variance can be used as voxel properties in the line-segment detector. Voxels belonging to the same line segment are connected and therefore can be used in the parameter estimation. The line-segment detector allows an estimation of the connectivity. The estimated connectivity information can be used to enhance the weights $a^n_{ij}$ of those voxels connected to $x_i$:

$$a^n_{i,j} = k_i^n \left( a_n + \sum_{\forall x_k \in G(x_i)} \left( w_\mu L_{\mu_n}(x_i, x_j, x_k) + w_\sigma L_{\sigma_n^2}(x_i, x_j, x_k) \right) \right), i \neq j$$

$$a^n_{i,i} = k_i^n \left( a_n + \sum_{\forall x_k \in G(x_i)} \sum_{\forall x_k \in G(x_i)} \left( w_\mu L_{\mu_n}(x_i, x_j, x_k) + w_\sigma L_{\sigma_n^2}(x_i, x_j, x_k) \right) \right)$$

where $a_n$=the initial weight at step n, for mean and variance parameters:

$$a_n = \frac{\sigma_n(x)}{\sigma_\sigma(x)}$$

The selection of the weights $w_\mu$, $w_\delta$ is not trivial and must reflect the behavior of the estimated parameters. For mean and variance estimations, a good selection is given by the weights that minimize the local energy. Examples of such weights are:

$$w_\mu = k_\mu (|\mu(x_j) - \mu(x_k)| + \delta_\delta)^{-1}$$

$$w_\delta = k_\delta (|\delta(x_j) - \delta(x_k)| + \delta_\mu)^{-1}$$

Thus, the weight gain is related to the local dispersion. $k_i$ is the normalization constant given by $$k_i^n = 1 \Big/ \sum_{j=1}^{N} a_{i,j}$$

where N is the number of points in the neighborhood. In other words, the weight $a^n_{i,j}$ is increased if $x_i$ and $x_j$ are estimated to be connected by the line-segment detector for each parameter. If line structures are present, the line-segment detection should include end-line detection, which can be performed by adding the following condition to the line detector:

$$L_{end} = \begin{cases} 1 & \text{if } |p(x) - p(x_i)| < T_e \sigma_p(x), x_i \in G(x) \\ 0 & \text{otherwise} \end{cases}$$

and then using that condition in conjunction with the equations set forth above for $a^n_{i,j}$ and $a^n_{i,i}$.

The approach just disclosed is a recursive approach, iteratively refining the mean and variance estimations. Therefore, that approach should be repeated several times until a convergence criterion has been met. Experience and several trials have shown that twenty iterations are enough to get reliable estimations of the mean and variance. Therefore, the approach just disclosed is faster than stochastic relaxation techniques.

The voxel connectivity estimation employs variance measures. To determine whether the estimated variances are similar, the ratio of $\hat{\delta}_j^2(x)$ to the estimated variance $\hat{\delta}_i^2(x)$ is computed:

$$F_j = \frac{\hat{\sigma}_j^2}{\hat{\sigma}_i^2(x)} \cong \frac{\sigma_j^2(a,b,c) + \sigma_\eta^2 / I^2(a,b,c)}{\sigma_i^2(a,b,c) + \sigma_\eta^2 / I^2(a,b,c)}$$

where $\delta_\eta^2$ is the noise variance. That ratio follows anfdistribution and can be taken to be independent of the noise $\eta$ if the square field intensity function is much greater than the noise variance, or $I^{2(x)} >> \delta_\eta^2$. If the cliques under consideration are of similar size, a $\hat{\delta}_j^2(x)$ and $\hat{\delta}_i^2(x)$ are said to estimate the same variance if $F_j$ is less than a given threshold $t_h \geq 1$. In other words, if $F_j < t_h$, there is an arc that joins the neighbor voxel $(a,b,c) \in C_j \subset R_i$ to the voxel $x \in R_i$.

It is helpful to have another, independent test for connectivity. One such independent test is based on the scalar Mahalanobis distance between voxels, which is defined as $$d_i(g(x_j)) = \frac{|\mu(x_i) - g(x_j)|}{\sigma(x_i)}$$

In case the field intensity is nonuniform, such that for a small displacement $\Delta x$ the field intensity is $I(x+\Delta x) = (131\ \alpha_x)I(x)$, one can set a threshold distance $d_{min}$ and say that two neighbor voxels are connected if $$d_i(g(x_j)) - \alpha_x \frac{\mu(x_i)}{\sigma(x_i)} \cong d_i(f(x_j)) \leq d_{min}$$

That approach is robust for illumination variations and is computationally efficient because the voxel connectivity computations can be done in a single scan of the image. For every possible arc, there are two connectivity estimations; since the cost of making a wrong connection is greater than that of not making a right connection, a connection is not made unless both estimations agree.

Once the connectivity graph is built, each region is the set of all voxels belonging to the same connected components. However, there can be some leakage among the regions caused by noise and poor mean and variance estimations. Various techniques can be used to avoid such leakage. In one such technique, a simple 3D morphological closing operation can be applied to the connectivity graph to split loose connected regions by removing all isolated joining arcs. Another such technique is the use of hysteresis with the selection of two different thresholds. The final connectivity map is formed by the connectivity of the high threshold plus the neighbor components from the lower threshold. The latter technique is preferred as being more computationally efficient.

Real images, of course, do not follow the basic image model set forth above in which small continuous line structures are always present between the regions; accordingly, the segmentation resulting from the approach just disclosed is not free from misclassifications of the volume image. Furthermore, an incorrect selection of the threshold $t_h$ causes an incorrect segmentation of the image. A large threshold causes some regions to be merged, while a small threshold results in multiple broken regions. If a region is broken into several contiguous patches, the problem can be addressed by merging the patches. In keeping with the image model, neighboring images patches whose means are equal are said to belong to the same region.

The region splitting of step 109 will now be described. Even after hysteresis, similar structures can be improperly merged. A simple way to test whether one extracted region is formed by two or more independent structures is by computing the error of fitting that region to a smooth surface and then comparing that error to the average variance of the extracted region using the variance image. If the error is very different from the variance, the extracted region is not a single structure and must be split.

The best smooth surface $u(x)$ that fits the observed data to the region R, is the one that minimizes the square error:

$$MSE = \sum_{\forall x \in R_i} [u(x) - g(x)]^2$$

where g is the observed image. If the observed image suffers from field degradations, u should be able to model such degradations. In the case of an MRI, from a priori knowledge of coil field degradations, it can be assumed that $$I(x) = exp[-(a_0 + a_1 x + a_2 y + a_3 z + a_4 xy + a_5 xz + a_6 yz + a_7 x^2 + a_8 y^2 + a_9 z^2)].$$

In that case, a good model of $u_t(x)$ is given by the same expression, and the coefficients $a_1$ to $a_9$ can be found by the standard least-square approach on the logarithmic image log $g(x)$. Once the best smooth surface has been found that models the extracted region, all points that do not belong to the region can be removed if the fitting error is similar to the average standard deviation:

$$\hat{\sigma}_i = \frac{1}{N_i} \sum_{\forall x \in R_i} \sigma(x)$$

where δ(x) is the estimated standard deviation derived above. That value is then compared to the distance $d_{hplane}$ of the points to the surface, which is given by $$d_{hplane}(x) = |u_i(x) - g(x)|, \quad \forall x \in R_i.$$

If for a given voxel x the distance is less than a given threshold value $t_p\hat{\delta}_i$, then the voxel is determined to belong to the region.

On the other hand, if the MSE fitting error derived above is much larger than $\hat{\delta}_i$, then the region is most likely composed of two or more structures and has to be split. If it is assumed that only two structures are merged, one simple way to split them is to use the following iterative operation:

(1) Estimate u(x) using an MSE criterion.
(2) Test for point membership using the distance criterion (the comparison between the distance and the threshold value) just set forth.
(3) Estimate a new u(x) using the points outside the region.
(4) Does the error decrease? If not, go back to (2).

That simple iterative process extracts the major structure in the region; the remainder of the region is marked as a new region. That approach is a simple generalization of the known k-means algorithm, where k=2 and an optimal class surface is sought instead of an optimal class centroid.

At that stage, it is possible to correct for the field degradation. Given the expression for I(x) set forth above, the parameters $a_1$ through $a_9$ are the average values for those parameters over the surface functions of the major extracted regions, while $a_0$ is assumed not to be recoverable and is set to an arbitrary value. Such treatment of $a_0$ makes sense when it is recalled that such parameter does not contribute to the space variation of I(x) but instead contributes only to a coefficient in front of the exponent. From the image model, if the Gaussian noise η(x) is sufficiently small, g(x)=I(x)J(x), or in other words, f(x)=g(x)/I(x).

The Gibbs random-field based segmentation relaxation of step 111 serves the purpose of correcting segmentation errors by minimizing the a posteriori probability. To that end, a Markov random field model of the labeled image is assumed, wherein the voxel label probability is a function of the neighboring labels. A Gibbs random field is assumed for the estimation of the probabilities of the voxels, given the distribution of the neighbor labels. The a posteriori probability can be optimized using an iterated conditional modes approach that has been used successfully in image restoration.

If L(x) is the labeled image and $f_1(x)$ is the principal component of the field-corrected image, a Gibbs random field model of the image gives the a posteriori probability distribution function:

$$p(L(x_i) | L(x_j), L(x_j), \forall x_j \in G(x_i)) \propto$$

$$\exp\left[ -\sum_{a \in G_x} \frac{[g(a) - y_i(x)]^2}{2s_i(x)} - \gamma \sum_{C \in G_x} V_C(L) \right]$$

where $V_C(L)$ is the clique potential associated with a neighborhood system in the volumetric image $G_x$, x∈L, $y_i$ and $s_i$ are the mean and variance, and γ is the normalization constant. $V_C$ can be expressed in terms of the arbitrary cost functions f and h:

$$V_C(L(x_i), L(x_j)) = \begin{cases} -f(g(x_i) - g(x_j)) & \text{if } L(x_i) = L(x_j) \\ h(g(x_i) - g(x_j)) & \text{if } L(x_i) \neq L(x_j) \end{cases}$$

Typically, the cost functions are both constant, but in a preferred implementation, $f(x) = \alpha s_1/(s_i + |x|^2)$ and h(x)=β are used to penalize gray-value deviations from the central voxel. The degree of the penalty can be set by setting α and β.

A global minimization of that equation is possible but time consuming. Instead, the iterated conditional mode (ICM) is used. That technique iteratively minimizes the function by using the previous solution to estimate the Gaussian PDF (probability density function) and the probabilities at every step. Such a process does not guarantee a global minimum, but given good initial conditions, it converges to a mean-optimal local minimum.

The statistical region merging of step 113 will now be described. A simple statistical t-test can be applied to determine, with a given confidence α, whether two neighboring image patches have equal means. Given a patch $P_i$ with mean and variance ($y_i$, $s_i$) and a neighbor patch $P_j$ with mean and variance ($y_j$, $s_j$) from the field-corrected image, the two patches have the same mean within a confidence of 1−α if $$t_o = \frac{y_i - y_j}{\sqrt{\frac{s_i^2}{n_i} + \frac{s_j^2}{n_j}}}$$

is greater than $t_{\alpha,v}$, where v, the number of degrees of freedom, is given by $$v = \frac{\left(\frac{s_i^2}{n_i} + \frac{s_j^2}{n_j}\right)^2}{\frac{(s_i^2/n_i)^2}{n_i - 1} + \frac{(s_j^2/n_j)^2}{n_j - 1}}$$

and the n values are the numbers of points included in the estimation of the y and s values. Those calculations are based on the t-test known in the art.

That simple criterion is able to merge most of the misclassified segments into homogeneous regions if the image is free of inhomogeneities. The image inhomogeneities constrain the user to the use of only the local mean and variance estimates for each voxel in the patch. Then, the local mean and variance at every voxel in the boundary between patches i and j are used in the equation for $t_o$ above to test whether both regions are equal. For the mean and variance, the estimations from the connectivity graph construction can be used; however, such estimations are less reliable than the following windowed estimations:

$$y_i(x_i) = \sum_{\forall x_k \in P_i} w_i(x_k) g(x_k)$$

$$s_i^2(x_j) = \sum_{\forall x_k \in P_i} w_i(x_k)(g(x_k) - y_i(x_j))^2$$

where the coefficients w determine the window shape and satisfy $$\sum_{\forall x_k \in P_i} w_i(x_k) = 1$$

A Gaussian window is used, centered at the boundary voxel $x_t \epsilon P_i$.

On the other hand, if it is assumed that the mean and variance come from normal distributions, the Chernoff distance can be used:

$$d_c(s) =$$

$$\frac{s(1-s)}{2}(\mu_i - \mu_j)^t \left[s\sum_i + (1-s)\sum_j\right]^{-1}(\mu_i - \mu_j) + \frac{1}{2}\ln\frac{\left|s\sum_i + (1-s)\sum_j\right|}{\left|\sum_i\right|^s\left|\sum_j\right|^{1-s}}$$

where $E_i$ and $E_j$ are the covariance matrices and s is a constant that minimizes the Bayes error $$\eta = \int min[P_i p_i(x), P_j p_j(x)] dx$$

for normal distributions and is given by the point where the Chernoff distance is a maximum. If the optimum distance is not a concern, setting $s=\frac{1}{2}$ simplifies the normal distribution to provide the Bhattacharyya distance $$B(\mu_i, \mu_j) = \frac{1}{8}(\mu_i - \mu_j)^T \left(\frac{\sum_i + \sum_j}{2}\right)^{-1}(\mu_i - \mu_j) + \frac{1}{2}\ln\frac{\sum_i + \sum_j}{2\sqrt{|\sum_i| + |\sum_j|}}$$

That distance is easy to compute and is a good measure of the separability of two distributions. By using that distance, the user can set a threshold to decide whether the distributions of the points in two patches are similar.

Once the statistical region merging of step 113 has been carried out, segmentation relaxation can be performed again at step 115. The process ends at step 117 with a segmented image.

Figure 6:
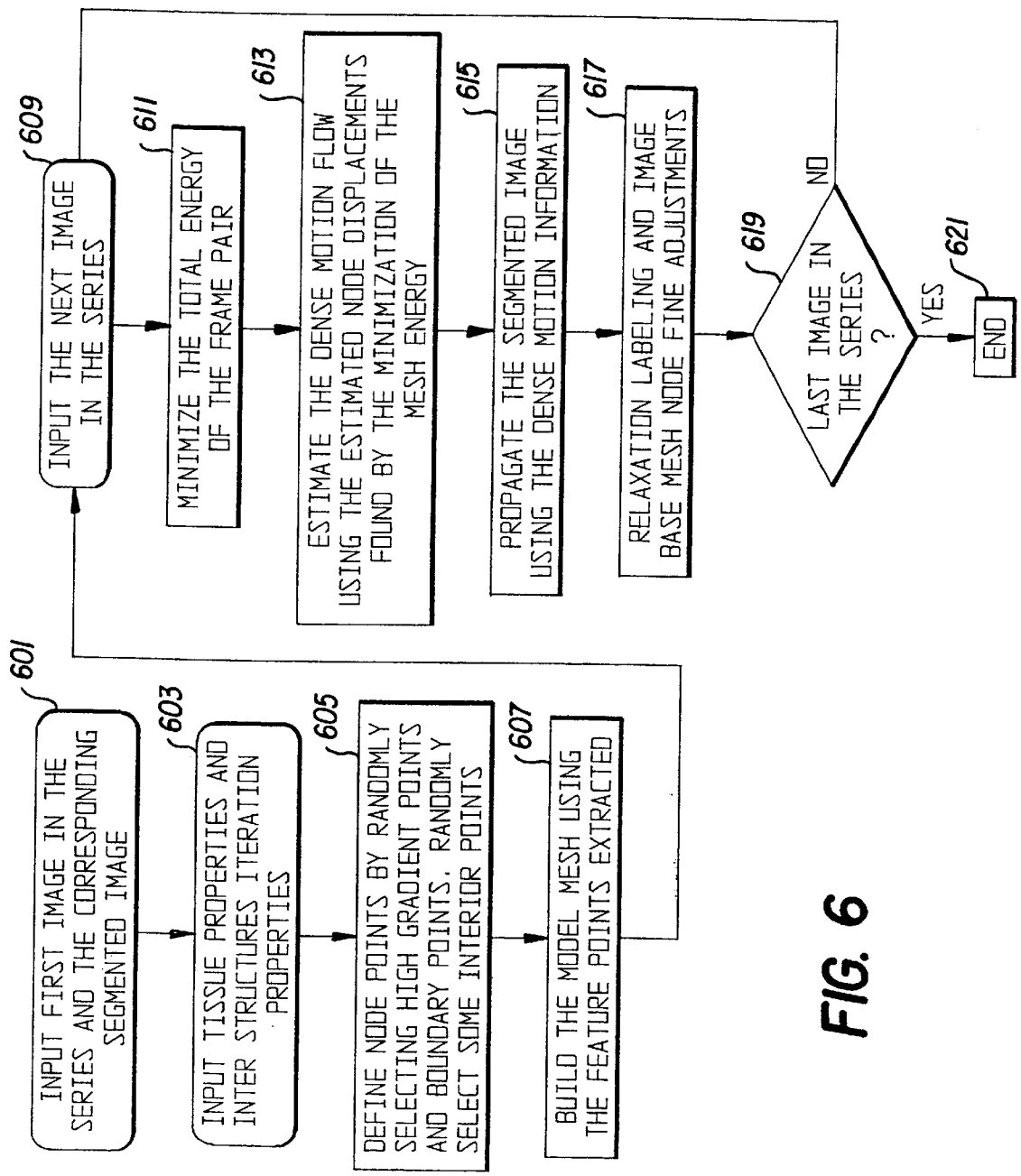
FIG. 6 shows a flow chart of operational steps involved in motion estimation and tracking of successive images.

Once the image has been suitably divided into regions, motion estimation and tracking can be undertaken for a series of MRI scans. The process for doing so is shown in the flow chart of FIG. 6, which will be described in detail below. If the image is of a joint, the motion is complex because of the non-rigid motion of the soft tissues involved, such as 410 tendons, ligaments, and muscle. Such non-rigid motion causes topological changes that make the application of automatic 4D segmentation difficult.

Although the segmentation of the next 3D image in the sequence can be done in the same manner just set forth, that approach introduces certain problems. First, the boundary between low-contrast structures is not well defined; therefore, noise and sampling cause the boundaries formed by segmentation to change between images in a sequence. Second, there are so many structures that maintaining a consistent labeling for each image in the sequence is difficult. Third, the segmentation algorithm is computationally demanding, so it is preferable not to re-run the segmentation algorithm for each image in the sequence. Accordingly, an alternative approach has been developed for the segmentation of the remaining images in the sequence.

A motion tracking and estimation algorithm provides the information needed to pass the segmented image from one frame to another once the first image in the sequence and the completely segmented image derived therefrom as described above have been input at step 601. The presence of both the rigid and non-rigid components should ideally be taken into account in the estimation of the 3D motion. According to the present invention, the motion vector of each voxel is estimated after the registration of selected feature points in the image.

To take into consideration the movement of the many structures present in a joint, the approach of the present invention takes into account the local deformations of soft tissues by using a priori knowledge of the material properties of the different structures found in the image segmentation. Such knowledge is input in an appropriate database form at step 603. Also, different strategies can be applied to the motion of the rigid structures and to that of the soft tissues. Once the selected points have been registered, the motion vector of every voxel in the image is computed by interpolating the motion vectors of the selected points. Once the motion vector of each voxel has been estimated, the segmentation of the next image in the sequence is just the propagation of the segmentation of the former image. That technique is repeated until every image in the sequence has been analyzed.

Finite-element models (FEM) are known for the analysis of images and for time-evolution analysis. The present invention follows a similar approach and recovers the point correspondence by minimizing the total energy of a mesh of masses and springs that models the physical properties of the anatomy. In the present invention, the mesh is not constrained by a single structure in the image, but instead is free to model the whole volumetric image, in which topological properties are supplied by the first segmented image and the physical properties are supplied by the a priori properties and the first segmented image. The motion estimation approach is an FEM-based point correspondence recovery algorithm between two consecutive images in the sequence. Each node in the mesh is an automatically selected feature point of the image sought to be tracked, and the spring stiffness is computed from the first segmented image and a priori knowledge of the human anatomy and typical biomechanical properties for muscle, bone and the like.

Many deformable models assume that a vector force field that drives spring-attached point masses can be extracted from the image. Most such models use that approach to build semi-automatic feature extraction algorithms. The present invention employs a similar approach and assumes that the image sampled at t=n is a set of three dynamic scalar fields: $\Phi(x,t) = \{g_n(x), |\nabla g_n(x)|, \nabla^2 g_n(x)\}$, namely, the gray-scale image value, the magnitude of the gradient of the image value, and the Laplacian of the image value. Accordingly, a change in $\Phi(x,t)$ causes a quadratic change in the scalar field energy $U_\Phi(x) (\Delta\Phi(x))^2$. Furthermore, the structures underlying the image are assumed to be modeled as a mesh of spring-attached point masses in a state of equilibrium with those scalar fields. Although equilibrium assumes that there is an external force field, the shape of the force field is not important. The distribution of the point masses is assumed to change in time, and the total energy change in a time period $\Delta t$ after time t=n is given by $$\Delta U_n(\Delta X) =$$

$$\sum_{\forall X \in g_n} \left[(\alpha(g_n(x) - g_{n+1}(x + \Delta x)))^2 + (\beta(|\nabla g_n(x)| - |\nabla g_{n+1}(x + \Delta x)|))^2 + \right.$$

-continued $$(\gamma(\nabla^2 g_n(x) + \nabla^2 g_{n+1}(x + \Delta x)))^2 + \frac{1}{2}\eta\Delta X^T K \Delta X\Bigg]$$

where α, β, and γ are weights for the contribution of every individual field change, η weighs the gain in the strain energy, K is the FEM stiffness matrix, and ΔX is the FEM node displacement matrix. Analysis of that equation shows that any change in the image fields or in the mesh point distribution increases the system total energy. Therefore, the point correspondence from $g_n$ to $g_{n+1}$ is given by the mesh configuration whose total energy variation is a minimum. Accordingly, the point correspondence is given by $$\hat{X} = X + \Delta\hat{X}$$

where $$\Delta\hat{X} = \min_{\Delta X} \Delta U_n(\Delta X)$$

In that notation, $\min_p q$ is the value of p that minimizes q.

While the equations set forth above could conceivably be used to estimate the motion (point correspondence) of every voxel in the image, the number of voxels, which is typically over one million, and the complex nature of the equations make global minimization difficult. To simplify the problem, a coarse FEM mesh is constructed with selected points from the image at step 605. The energy minimization gives the point correspondence of the selected points.

The selection of such points is not trivial. First, for practical purposes, the number of points has to be very small, typically≈$10^4$; care must be taken that the selected points describe the whole image motion. Second, region boundaries are important features because boundary tracking is enough for accurate region motion description. Third, at region boundaries, the magnitude of the gradient is high, and the Laplacian is at a zero crossing point, making region boundaries easy features to track. Accordingly, segmented boundary points are selected in the construction of the FEM.

Although the boundary points represent a small subset of the image points, there are still too many boundary points for practical purposes. In order to reduce the number of points, constrained random sampling of the boundary points is used for the point extraction step. The constraint consists of avoiding the selection of a point too close to the points already selected. That constraint allows a more uniform selection of the points across the boundaries. Finally, to reduce the motion estimation error at points internal to each region, a few more points of the image are randomly selected using the same distance constraint. Experimental results show that between 5,000 and 10,000 points are enough to estimate and describe the motion of a typical volumetric image of 256×256×34 voxels. Of the selected points, 75% are arbitrarily chosen as boundary points, while the remaining 25% are interior points. Of course, other percentages can be used where appropriate.

Once a set of points to track is selected, the next step is to construct an FEM mesh for those points at step 607. The mesh constrains the kind of motion allowed by coding the material properties and the interaction properties for each region. The first step is to find, for every nodal point, the neighboring nodal point. Those skilled in the art will appreciate that the operation of finding the neighboring nodal point corresponds to building the Voronoi diagram of the mesh. Its dual, the Delaunay triangulation, represents the best possible tetrahedral finite element for a given nodal configuration. The Voronoi diagram is constructed by a dilation approach. Under that approach, each nodal point in the discrete volume is dilated. Such dilation achieves two purposes. First, it is tested when one dilated point contacts another, so that neighboring points can be identified. Second, every voxel can be associated with a point of the mesh.

Once every point $x_i$ has been associated with a neighboring point $x_j$, the two points are considered to be attached by a spring having spring constant $k_{i,j}l,m$, where l and m identify the materials. The spring constant is defined by the material interaction properties of the connected points; those material interaction properties are predefined by the user in accordance with known properties of the materials. If the connected points belong to the same region, the spring constant reduces to $k_{i,j}^{l,l}$ and is derived from the elastic properties of the material in the region. If the connected points belong to different regions, the spring constant is derived from the average interaction force between the materials at the boundary. If the object being imaged is a human shoulder, the spring constant can be derived from a table such as the following:

| $K_{i,j}^{l,m}$ | Humeral head | Muscle | Tendon | Cartilage |
|---|---|---|---|---|
| Humeral head | $10^4$ | 0.15 | 0.7 | 0.01 |
| Muscle | 0.15 | 0.1 | 0.7 | 0.6 |
| Tendon | 0.7 | 0.7 | 10 | 0.01 |
| Cartilage | 0.01 | 0.6 | 0.01 | $10^2$ |

In theory, the interaction must be defined between any two adjacent regions. In practice, however, it is an acceptable approximation to define the interaction only between major anatomical components in the image and to leave the rest as arbitrary constants. In such an approximation, the error introduced is not significant compared with other errors introduced in the assumptions set forth above.

Spring constants can be assigned automatically, as the approximate size and image intensity for the bones are usually known a priori. Segmented image regions matching the a priori expectations are assigned to the relatively rigid elastic constants for bone. Soft tissues are assigned relatively soft elastic constants.

Once the mesh has been set up, the next image in the sequence is input at step 609, and the energy between the two successive images in the sequence is minimized at step 611. The problem of minimizing the energy U can be split into two separate problems: minimizing the energy associated with rigid motion and minimizing that associated with deformable motion. While both energies use the same energy function, they rely on different strategies.

The rigid motion estimation relies on the fact that the contribution of rigid motion to the mesh deformation energy $(\Delta X^T K \Delta X)/2$ is very close to zero. The segmentation and the a priori knowledge of the anatomy indicate which points belong to a rigid body. If such points are selected for every individual rigid region, the rigid motion energy minimization is accomplished by finding, for each rigid region $R_i$, the rigid motion rotation $R_i$ and the translation $T_i$ that minimize that region's own energy:

$$\Delta X_{rigid} = \min_{\Delta X} U_{rigid} = \sum_{\forall i \in rigid} \left(\Delta\hat{X}_i = \min_{\Delta X_i} U_n(\Delta X_i)\right)$$

where $\Delta X_i = R_i \cdot X_i + T_i X_i$ and $\Delta\hat{X}^i$ is the optimum displacement matrix for the points that belong to the rigid region $R_i$. That minimization problem has only six degrees of freedom for each rigid region: three in the rotation matrix and three in the translation matrix. Therefore, the twelve components (nine rotational and three translational) can be found via a six-dimensional steepest-descent technique if the difference between any two images in the sequence is small enough.

Once the rigid motion parameters have been found, the deformational motion is estimated through minimization of the total system energy U. That minimization cannot be simplified as much as the minimization of the rigid energy, and without further considerations, the number of degrees of freedom in a 3D deformable object is three times the number of node points in the entire mesh. The nature of the problem allows the use of a simple gradient descent technique for each node in the mesh. From the potential and kinetic energies, the Lagrangian (or kinetic potential, defined in physics as the kinetic energy minus the potential energy) of the system can be used to derive the Euler-Lagrange equations for every node of the system where the driving local force is just the gradient of the energy field. For every node in the mesh, the local energy is given by $$U_{X_i,n}(\Delta x) = (\alpha(g_n(x_i + \Delta x) - g_{n+1}(x_i)))^2 + (\beta(|\nabla g_n(x_i + \Delta x)| - |\nabla g_{n+1}(x_i)|))^2 +$$
$$\gamma(\nabla^2 g_n(x_i + \Delta x) + \nabla^2 g_{n+1}(x_i))^2 + \frac{1}{2}\eta \sum_{x_j \in G_m(X_i)} (k_{i,j}^{l,m}(x_j - x_i - \Delta x))^2$$

where $G$, represents a neighborhood in the Voronoi diagram.

Thus, for every node, there is a problem in three degrees of freedom whose minimization is performed using a simple gradient descent technique that iteratively reduces the local node energy. The local node gradient descent equation is $$x_i(n+1) = x_i(n) - v\Delta U_{(x_i(n),n)}(\Delta x)$$

where the gradient of the mesh energy is analytically computable, the gradient of the field energy is numerically estimated from the image at two different resolutions, $x(n+1)$ is the next node position, and $v$ is a weighting factor for the gradient contribution.

At every step in the minimization, the process for each node takes into account the neighboring nodes' former displacement. The process is repeated until the total energy reaches a local minimum, which for small deformations is close to or equal to the global minimum. The displacement vector thus found represents the estimated motion at the node points.

Once the minimization process just described yields the sampled displacement field $\Delta X$, that displacement field is used to estimate the dense motion field needed to track the segmentation from one image in the sequence to the next (step 611). The dense motion is estimated by weighting the contribution of every neighbor mode in the mesh. A constant velocity model is assumed, and the estimated velocity of a voxel x at a time t is $v(x,t)=\Delta x(t)/\Delta t$. The dense motion field is estimated by $$v(x, t) = \frac{c(x)}{\Delta t} \sum_{\forall \Delta x_j \in G_m(x_i)} \frac{k^{l,m} \Delta x_j}{|x - x_j|}$$

where $$c(x) = \left[ \sum_{\forall \Delta x_j \in G_m(x_i)} \frac{k^{l,m}}{|x - x_j|} \right]^{-1}$$

$k^{l,m}$ is the spring constant or stiffness between the materials l and m associated with the voxels x and $x_j$, $\Delta t$ is the time interval between successive images in the sequence, $|x-x_j|$ is the simple Euclidean distance between the voxels, and the interpolation is performed using the neighbor nodes of the closest node to the voxel x. That interpolation weights the contribution of every neighbor node by its material property $k_{i,j}^{l,m}$; thus, the estimated voxel motion is similar for every homogeneous region, even at the boundary of that region.

Then, at step 615, the next image in the sequence is filled with the segmentation data. That means that the regions determined in one image are carried over into the next image. To do so, the velocity is estimated for every voxel in that next image. That is accomplished by a reverse mapping of the estimated motion, which is given by $$v(x, t + \Delta t) = \frac{1}{H} \sum_{\forall [x_j + v(x_j,t)] \in S(x)} v(x_j, t)$$

where H is the number of points that fall into the same voxel space $S(x)$ in the next image. That mapping does not fill all the space at time $t+\Delta t$, but a simple interpolation between mapped neighbor voxels can be used to fill out that space. Once the velocity is estimated for every voxel in the next image, the segmentation of that image is simply $$L(x,t+\Delta t)=L(x-v(x,t+\Delta t)\Delta t,t)$$

where $L(x,t)$ and $L(x,t+\Delta t)$ are the segmentation labels at the voxel x for the times t and $t+\Delta t$.

At step 617, the segmentation thus developed is adjusted through relaxation labeling, such as that done at steps 111 and 115, and fine adjustments are made to the mesh nodes in the image. Then, the next image is input at step 609, unless it is determined at step 619 that the last image in the sequence has been segmented, in which case the operation ends at step 621.

The approach described above requires the input of at least three parameters, namely, $t_h$, $d_{min}$, and the Bhattacharyya distance threshold. A variation of the segmentation operation will now be set forth in which unsupervised optimal segmentation is achieved through iterative optimization of the first two parameters.

Figure 7:
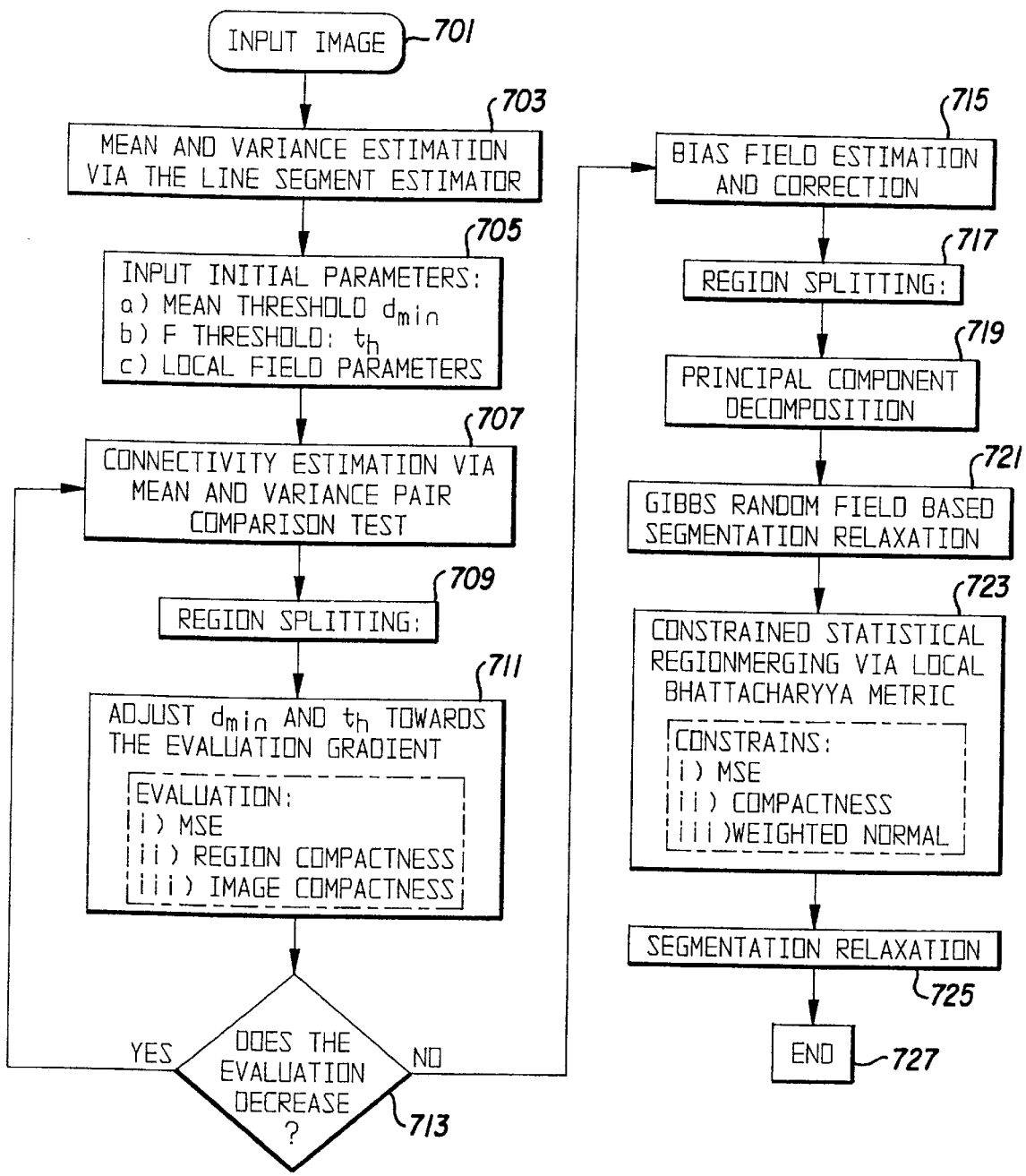
FIG. 7 is a flow chart showing a variation of the process of FIG. 1.

FIG. 7 shows a flow chart of such a variation in which the first two parameters are optimized by determining and minimizing a cost function of the first two parameters. The steps of inputting the image at step 701, estimating the mean and variance at step 703, inputting initial parameters at step 705, connectivity estimation at step 707, and region splitting at step 709 will be familiar from the description set forth above. Those steps produce iteration regions rather than producing the regions which will ultimately be used, since the optimization to be described will optimize the regions.

At step 711, the values of the parameters $t_h$ and $d_{min}$ are adjusted in the following manner. The mean square error (MSE) is given by $MSE=(1/V)\int(u(x)-\mu(x))^2 dx$, where V is the volume of the image. The image also has a surface area S. Each region $R_i$ has volume $V_i$ and surface area $S_i$. Both the image and each region have a compactness given by (surface area)$^{1.5}$/volume. In order to optimize the values of the two parameters, an evaluation cost functional will be introduced to evaluate the cost of using any two particular values of the two parameters. A functional is defined as a rule that assigns to every function in a given set, or domain, of functions a unique real number. The evaluation cost functional is given by $$I = \frac{1}{V}\int (u(x) - \mu(x))^2 dx + \frac{w_1}{N}\sum_{i=0}^{N} \frac{S_i^{1.5}}{V_i} + w_2 \frac{S^{1.5}}{V}$$

where there are N regions and the w's are weighting factors. The evaluation cost functional I is a function of $t_h$ and $d_{min}$ and can therefore be minimized by setting $\partial I/\partial t_h = 0 = \partial I/\partial d_{min}$. Those equations can be solved by steepest descent, namely, by adjusting the values of $t_h$ and $d_{min}$ toward the gradient of the evaluation cost functional at step 711 and determining at step 713 whether the evaluation cost functional decreases. As long as the evaluation cost functional decreases, that process is reiterated.

Region merging will now be discussed. The bias or illumination field estimation and correction at step 715, the region splitting at step 717, the principal component decomposition at step 719, and the Gibbs random field based segmentation relaxation at step 721 will be familiar from the description already given. While it is possible to optimize the Bhattacharyya threshold T, a more computationally efficient technique is constrained merging. The constrained statistical region merging via the local Bhattacharyya distance, shown at step 723, is based on the principle that regions should preferably be merged if their compactness is reduced and should preferably not be merged if their compactness is increased. The reason for that principle is to avoid merging two thin regions such as cartilage and tendons. That is, the regions are not merged unless their Bhattacharyya distance is less than $T(C_i + C_j)/2C_{ij}$, where $C_i$, $C_j$, and $C_{ij}$ respectively represent the compactnesses of the regions i and j, considered separately, and the compactness of the regions if combined. The process proceeds to segmentation relaxation at step 725 and ends at step 727.

The approach described above has been tested in several MRI volumetric image sequences. An example will now be set forth for a flexing knee. Six images were taken of the knee; each image had a resolution of 60×256×256 voxels, with each voxel measuring 0.47 mm×0.47 mm×1.4 mm.

Figure 8A:
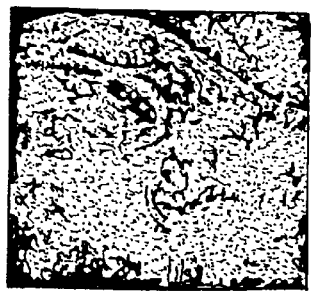
FIGS. 8A–8D are drawings showing an image of a flexing knee in four stages of segmentation and motion estimation.
Figure 8B:
Figure 8C:
Figure 8D:
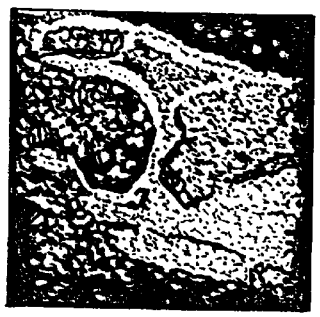
Figures 9A, 9B, 9C, 9D, 9E, 9F:
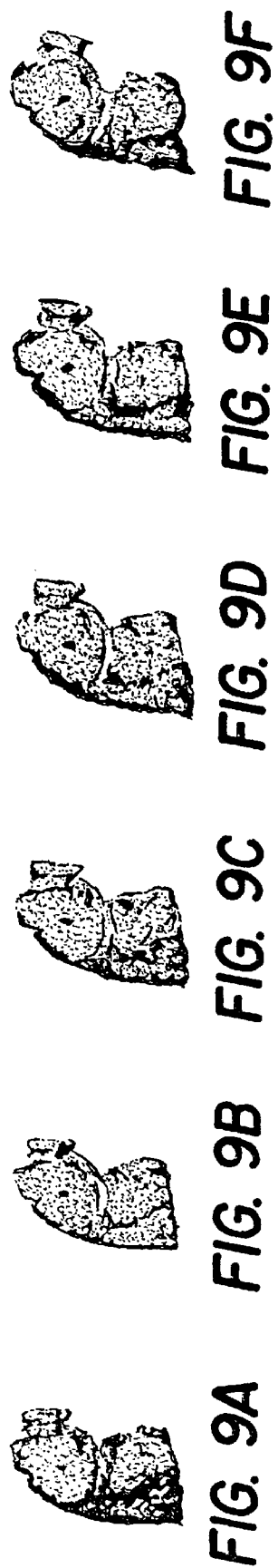
FIGS. 9A–9F are drawings showing six images of the flexing knee of FIGS. 8A–8D after motion estimation and surface rendering.

FIGS. 8A–8D show a single image in the sequence. FIG. 8A shows the raw data. FIG. 8B shows the final segmentation. FIG. 8C shows the estimated region boundaries from the final segmentation superimposed on the raw data. FIG. 8D shows the estimated motion flow from the fifth image to the sixth image. Surface renderings from the six images of the bending knee are shown in FIGS. 9A–9F.

Figure 10:
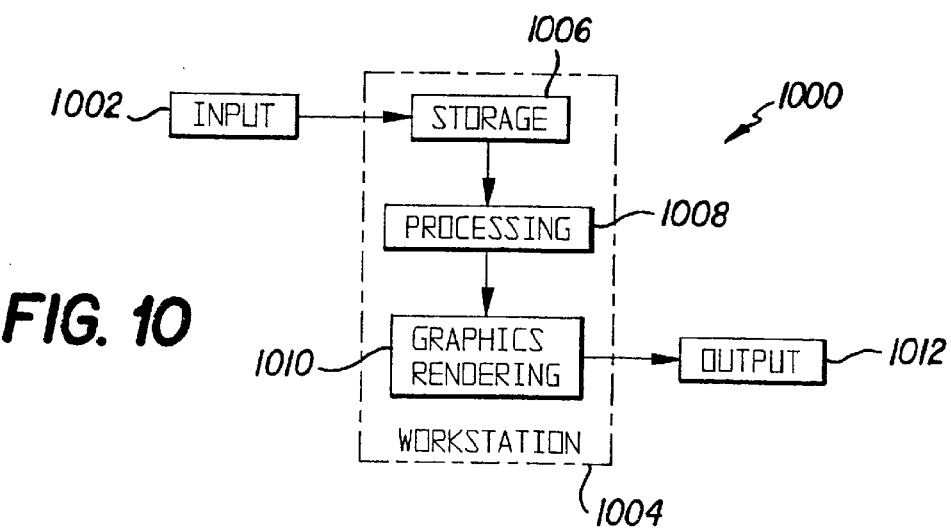
FIG. 10 is a block diagram showing a system on which the present invention can be implemented.

The embodiment disclosed above and other embodiments can be implemented in a system such as that shown in the block diagram of FIG. 10. System 1000 includes an input device 1002 for input of the image data, the database of material properties, and the like. The information input through the input device 1002 is received in the workstation 1004, which has a storage device 1006 such as a hard drive, a processing unit 1008 for performing the processing disclosed above to provide the 4D data, and a graphics rendering engine 1010 for preparing the 4D data for viewing, e.g., by surface rendering. An output device 1012 can include a monitor for viewing the images rendered by the rendering engine 1010, a further storage device such as a video recorder for recording the images, or both. As noted above, illustrative examples of the workstation 1004 and the graphics rendering engine 1010 are a Silicon Graphics Indigo workstation and an Irix Explorer 3D graphics engine.

Furthermore, the system 1000 shown in FIG. 10 and the invention as more generally set forth herein make possible a virtual reality interaction by a clinician with the digital clone. In the output shown in FIGS. 9A–9F, the segmented patella, for example, can be selectively examined, rotated, measured or otherwise manipulated. Moreover, forces can be applied to the virtual patella, and by means of the FEM model set forth above, the response of the virtual patella can be examined. This virtual reality interaction can be implemented in the system 1000 shown in FIG. 10 or any suitable equivalent system through a combination of the present invention with conventional virtual reality techniques.

While a preferred embodiment of the invention has been set forth, those skilled in the art who have reviewed this disclosure will readily appreciate that other embodiments are possible within the scope of the invention. For example, while the preferred embodiment has been disclosed in the context of MRI analysis of human tissue, the object to be imaged can be of non-human tissue or of non-biological material, and the sequence of images can be obtained in any suitable manner, such as X-ray CT scanning or other means. Moreover, while the image g has been disclosed as a gray-scale image, color or pseudo-color images, multimensional images, or multispectral images could also be analyzed.

We claim:

1. A method for producing an interactive virtual reality replica of an object, comprising the steps of:
    (a) forming a sequence of images of an object, the images being separated from one another in time, and each of the images comprising a plurality of image elements;
    (b) dividing one of said images of said sequence of images into regions, each of said regions corresponding to a component of said object, by (i) estimating local statistical properties for said image in each of said image elements in the image and (ii) Joining said image elements into said regions in accordance with similarities among said local statistical 410 properties of said image elements; and
    (c) defining said regions in all of said images by (i) providing a database of characteristics of the components of said object, (ii) estimating a movement of each of said regions in accordance with said database, and (iii) determining locations of said regions in all of said images in accordance with said movement.

2. The method of claim 1, wherein each of said images is a three-dimensional image and each of said image elements is a voxel.

3. The method of claim 1, wherein said local statistical properties comprise local mean and variance properties.

4. The method of claim 1, wherein step (b) further comprises (iii) testing each of said regions to detect regions corresponding to multiple components of said object and splitting the regions corresponding to said multiple components of said object to produce new regions each corresponding to a single component of said object and (iv) testing each of said regions to detect regions corresponding to parts of components of said object and merging the regions corresponding to the parts of the components of said object to produce new regions each corresponding to an entire component of said object.

5. The method of claim 4, wherein the regions corresponding to the parts of the components are detected in accordance with a compactness of each region.

6. The method of claim 1, wherein said database comprises internal motion characteristics of the components and characteristics of relative motion between adjacent ones of the components.

7. The method of claim 6, wherein the characteristics of the relative motion are expressed as spring constants.

8. The method of claim 7, wherein step (c)(ii) comprises modeling said object as a finite element mesh using a subplurality of the image elements.

9. The method of claim 6, wherein step (c)(ii) comprises minimizing an energy of each two consecutive images in said sequence.

10. The method of claim 9, wherein the movement estimated in step (c)(ii) comprises a rigid movement and a deformational movement, and the energy comprises an energy of the rigid movement and an energy of the deformational movement.

11. The method of claim 9, wherein step (c)(ii) further comprises estimating a velocity of each of said image elements in accordance with the minimized energy.

12. The method of claim 1, wherein step (b)(ii) comprises (A) joining the images in accordance with at least one threshold value to form iteration regions, (B) deriving a cost functional from the iteration regions, and (C) optimizing the cost functional.

13. The method of claim 12, wherein step (C) comprises adjusting the at least one threshold value to decrease the cost functional iteratively until the cost functional no longer decreases.

14. A system for reconstructing an image in both space and time from raw image data, the image data comprising a sequence of images of an object, the images being separated from one another in time, and each of the images comprising a plurality of image elements, the system comprising:
input means for receiving an input of the raw image data and of a database of characteristics of components of the object;
processing means for (a) dividing an image from among the images into regions, each of the regions corresponding to a component of the object, by (i) estimating local statistical properties for the image in each of the image elements in the image and (ii) joining the image elements into the regions in accordance with similarities among said local statistical properties of the image elements and for (b) defining the regions in all of the images by (i) estimating a movement of each of the regions in accordance with the database and (ii) determining locations of the regions in all of the images in accordance with the movement; and
graphical rendering means for providing a virtual reality representation and visualization of all of the images with the regions located in all of the images.

15. The system of claim 14, wherein each of the images is a three-dimensional image and each of the image elements is a voxel.

16. The system of claim 14, wherein said local statistical properties comprise local mean value and local variance properties.

17. The system of claim 14, wherein the processing means comprises means for testing each of the regions to detect regions corresponding to multiple components of the object and splitting the regions corresponding to the multiple components of the object to produce new regions, each corresponding to a single component of the object, and for testing each of the regions to detect regions corresponding to parts of components of the object and merging the regions corresponding to the parts of the components of the object to produce new regions each corresponding to an entire component of the object.

18. The system of claim 17, wherein the regions corresponding to the parts of the components are detected in accordance with a compactness of each region.

19. The system of claim 14, wherein the database comprises internal motion characteristics of the components and characteristics of relative motion between adjacent ones of the components.

20. The system of claim 19, wherein the characteristics of the relative motion are expressed as spring constants.

21. The system of claim 20, wherein the processing means comprises means for modeling the object as a finite element mesh using a subplurality of the image elements.

22. The system of claim 19, wherein the processing means comprises means for minimizing an energy of each two consecutive images in said sequence.

23. The system of claim 22, wherein said estimated movement comp rises a rigid movement and a deformational movement, and the energy comprises an energy of the rigid movement and an energy of the deformational movement.

24. The system of claim 22, wherein the processing means comprises means for estimating a velocity of each of said image elements in accordance with the minimized energy.

25. The system of claim 14, wherein the processing means comprises means for (A) joining the images in accordance with at least one threshold value to form iteration regions, (B) deriving a cost functional from the iteration regions, and (C) optimizing the cost functional.

26. The system of claim 25, wherein the cost functional is optimized by adjusting the at least one threshold value to decrease the cost functional iteratively until the cost functional no longer decreases.

27. A method for producing, in a computing device, a virtual reality replica of a complex entity, comprising the steps of:
(a) forming a sequence of images of said complex entity, the images being separated from one another in time, and each of said images comprising a plurality of image elements;
(b) dividing one of said images of said sequence of images into regions, each of said regions corresponding to a component of said complex entity, by (i) estimating local statistical properties for said image in each of said image elements in the image and (ii) joining said image elements into said regions in accordance with similarities among said local statistical properties of said image elements;
(c) defining said regions in all of said images by (i) providing a database of characteristics of the components of said complex entity, (ii) estimating a movement of each of said regions in accordance with said database, and (iii) determining locations of said regions in all of said images in accordance with said movement; and
(d) rendering said regions in three spatial dimensions and one time dimension in a virtual reality environment.

28. The method of claim 2, wherein each of said regions is a three-dimensional region.

29. The method of claim 28, wherein said interactive virtual reality replica is rendered at least in three spatial dimensions.

30. The system of claim 15, wherein each of said regions is a three-dimensional region.

31. The system of claim 30, wherein said interactive virtual reality replica is rendered at least in three spatial dimensions.

32. The method of claim 27, wherein each of said images is a three-dimensional image, and each of the image elements is a voxel.

33. The method of claim 32, wherein each of said regions is a three-dimensional region.

34. A method for producing an interactive virtual reality replica of an object, comprising the steps of:
 a) forming an image of an object, the image comprising a plurality of image elements;
 b) dividing said image into regions, each of said regions corresponding to a component of said object, by
  i) estimating local statistical properties for said image in each of said image elements in the image; and
  ii) joining said image elements into said regions in accordance with similarities among said local statistical properties of said image elements; and
 (c) defining said regions in said image by
  i) estimating statistical properties of each region; and
  ii) joining and splitting said regions in accordance with the similarities among said statistical properties of said regions.

35. The method of claim 34, wherein said image is a three-dimensional image and each of said image elements is a voxel.

36. The method of claim 35, wherein each of said regions is a three-dimensional region.

37. The method of claim 36, wherein said interactive virtual reality replica is rendered at least in three spatial dimensions.

* * * * *